July 9, 1929.   T. H. THOMAS   1,720,250
ELECTROPNEUMATIC BRAKE
Filed Aug. 4, 1927
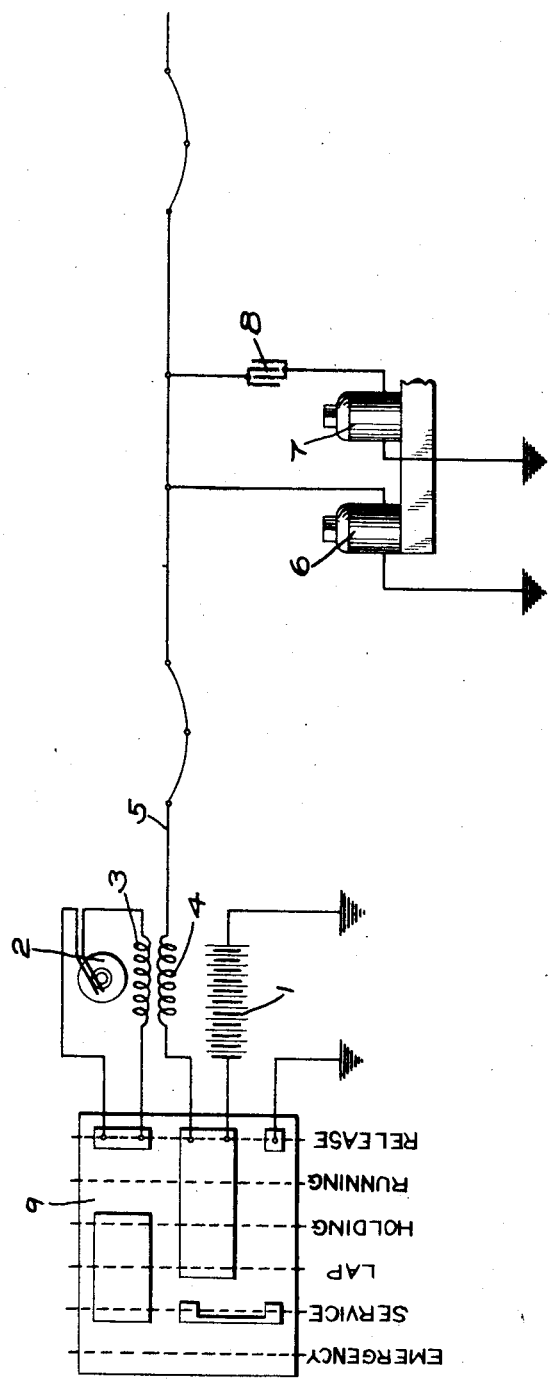
INVENTOR
THOMAS H. THOMAS
BY Wm. M. Cady
ATTORNEY Patented July 9, 1929.

1,720,250

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed August 4, 1927. Serial No. 210,616.

This invention relates to electro-pneumatic brake equipments, and more particularly to an electro-pneumatic brake equipment employing a single train wire and having a ground return.

The principal object of my invention is to provide an improved electro-pneumatic brake equipment of the above type.

In the accompanying drawing, the single figure is a diagrammatic view of an electro-pneumatic brake equipment embodying my invention.

According to my invention, two sources of electric current are employed, a direct current source, such as the battery 1, and a source of alternating current, such as the alternating current generator 2.

In the circuit of the generator 2 is a primary coil 3 co-operating with a secondary coil 4 disposed in circuit with the single train wire 5. A brake switch is provided which may be associated with the usual brake valve device, so that on the locomotive, the brakes are applied and released by operation of the brake valve device, while on the cars, the brakes are controlled electrically by the operation of the brake switch, which is moved with the brake valve device.

On each car of the train, magnets 6 and 7 are provided, each having one terminal connected to the train wire 5 and having the other terminal connected to ground. The circuit of the magnet 7 includes a condenser 8 for preventing flow of direct current from the train wire 5 to the magnet 7 and also to provide a resonant circuit, responsive only to the cycle frequency of the alternating current generator 2, so that the magnet 7 will only be energized by current from said generator and not by current from the battery 1.

In my prior application, Serial No. 170,071, filed February 23, 1927, I have shown and described an electro-magnetically controlled valve mechanism associated with control magnets, and a similar valve mechanism will be employed in connection with the magnets 6 and 7 of the present application. It is not deemed necessary, however, to illustrate and describe said valve mechanism, it being considered sufficient to point out that the magnets 6 and 7 and the valve mechanism in question will be effective as follows:

When the magnet 6 is energized and the magnet 7 deenergized, the usual brake cylinder is connected to the atmosphere and the brakes are released. When the magnet 6 is deenergized and the magnet 7 energized, fluid under pressure is supplied to the brake cylinder to effect a service application of the brakes. When the magnet 6 is energized and the magnet 7 is energized, further flow of fluid to the brake cylinder is cut off, while fluid in the brake cylinder is retained, in other words, this is a lap or holding position.

When both magnets are deenergized an emergency application of the brakes is effected.

In the drawing, the developed brake switch 9 is shown with the following positions, emergency, service, lap, holding, running, and release.

In the running position, the circuit of the alternating current generator is open, while the circuit of the battery 1 is closed. Direct current is then supplied to the train wire 5 and the magnet 6 is thereby energized. The magnet 7, being responsive only to alternating current of the cycle frequency generated by the generator 2, is not energized. The magnet 6 being thus energized and the magnet 7 deenergized, the brakes are released.

If the brake switch 9 is turned to service position, the train wire 5 is connected to ground and the circuit of the battery 1 is open, while the circuit of the generator 2 is closed. Alternating current thus flows through the primary coil 3 and thereby current is generated in the secondary coil 4, which current flows through the train wire 5 and energizes the magnet 7, while the magnet 6 remains deenergized, since magnet 6 will not be energized by alternating current.

The magnet 6 being deenergized and the magnet 7 energized, fluid under pressure is supplied to the brake cylinder to effect a service application of the brakes.

The brake valve being moved to service position with the brake switch, a pneumatic service application of the brakes will be effected on the locomotive.

In lap position, the circuit of the generator 2 is closed and the circuit of the battery 1 is also closed, so that alternating current is supplied to the train wire and also direct current from the battery 1. The magnet 6 is therefore energized by direct current, while the magnet 7 is energized by alternating current. Both magnets being energized, further flow of fluid to the brake cylinder is cut off and fluid in the brake cylinder is retained.

The corresponding movement of the brake valve to lap position operates to hold the brakes applied in the locomotive in the usual manner.

In emergency position, the circuits of both the generator 2 and the battery 1 are opened, so that both magnets 6 and 7 are deenergized and as a result, the brakes are applied to effect an emergency application of the brakes.

In release position, as in lap, the circuits of both the generator 2 and the battery 1 are closed, so that both magnets 6 and 7 are energized and the fluid pressure in the brake cylinder is retained.

The brake switch may be operated independently of the brake valve device by a separate handle and the locomotive may be equipped with the same electrically controlled brake apparatus as is applied to the cars.

Having now described my invention, what I claim as new and desire to secure by Letters Patent, is:—

1. In an electro-pneumatically controlled equipment, the combination with a single train wire and two magnets connected to said wire, of means for separately controlling said magnets through said wire including an alternating source of current and a direct source of current.

2. In an electro-pneumatically controlled equipment, the combination with a single train wire and two magnets connected to said wire, of means for separately controlling said magnets through said wire including means for supplying alternating current and means for supplying direct current to said wire.

3. In an electrically controlled apparatus, the combination with a single train wire and electrically controlled devices connected to said wire, of a source of direct current, a source of alternating current, and a manually operable switch device having positions for connecting said source of alternating current to apply alternating current to said wire and the source of direct current to supply direct current to said wire.

4. In an electrically controlled apparatus, the combination with a single train wire and electrically controlled devices connected to said wire, of a source of direct current, a source of alternating current, and a manually operable switch device having a position in which the source of alternating current is connected to effect the supply of alternating current to said wire, a position in which the source of direct current is connected to supply direct current to said wire, and a position in which both alternating and direct current is supplied to said wire.

5. In an electrically controlled brake, the combination with a single train wire and magnets connected to said wire for controlling the brakes, one magnet being energized only by alternating current and the other by direct current, of means for supplying either direct or alternating current to said wire.

In testimony whereof I have hereunto set my hand.

THOMAS H. THOMAS.